(12) United States Patent
Song et al.

(10) Patent No.: US 9,130,426 B2
(45) Date of Patent: Sep. 8, 2015

(54) PERMANENT MAGNET ROTORS AND METHODS OF ASSEMBLING THE SAME

(75) Inventors: Wei Song, Fort Wayne, IN (US); Bryan Stout, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 489 days.

(21) Appl. No.: 13/285,529

(22) Filed: Oct. 31, 2011

(65) Prior Publication Data
US 2013/0106207 A1 May 2, 2013

(51) Int. Cl.
*H02K 1/27* (2006.01)
*H02K 1/28* (2006.01)

(52) U.S. Cl.
CPC ..................... *H02K 1/278* (2013.01)

(58) Field of Classification Search
CPC ....................................... H02K 1/28
USPC ................ 310/43, 156.08, 156.19, 156.21, 310/156.23, 156.27
See application file for complete search history.

(56) References Cited

U.S. PATENT DOCUMENTS

| | | | | |
|---|---|---|---|---|
| 2,568,479 A | * | 9/1951 | Armstrong et al. | 310/153 |
| 3,764,576 A | * | 10/1973 | Russo | 524/112 |
| 4,777,397 A | | 10/1988 | Parshall | |
| 4,877,986 A | * | 10/1989 | Shimizu | 310/153 |
| 4,954,736 A | * | 9/1990 | Kawamoto et al. | 310/156.21 |
| 4,973,872 A | * | 11/1990 | Dohogne | 310/156.28 |
| 5,175,461 A | * | 12/1992 | Zigler et al. | 310/156.28 |
| 5,345,130 A | | 9/1994 | Kliman et al. | |
| 5,488,260 A | * | 1/1996 | Heyraud | 310/156.23 |
| 5,650,680 A | | 7/1997 | Chula | |
| 6,408,502 B1 | | 6/2002 | Brahmavar et al. | |
| 6,777,847 B1 | | 8/2004 | Saban et al. | |
| 7,030,529 B2 | * | 4/2006 | Dommsch et al. | 310/156.22 |
| 7,084,540 B2 | | 8/2006 | Brahmavar et al. | |
| 7,348,704 B2 | * | 3/2008 | Kim et al. | 310/156.13 |
| 7,545,067 B2 | * | 6/2009 | Drexlmaier | 310/156.13 |
| 7,687,957 B2 | * | 3/2010 | Ochiai et al. | 310/156.08 |
| 7,692,348 B2 | * | 4/2010 | Gruenhagen | 310/156.19 |
| 7,898,136 B2 | * | 3/2011 | Poulin et al. | 310/156.26 |
| 8,779,638 B2 | * | 7/2014 | Burton et al. | 310/43 |
| 8,872,396 B2 | * | 10/2014 | Sakata et al. | 310/43 |
| 2008/0185930 A1 | * | 8/2008 | Ahrens et al. | 310/156.08 |

FOREIGN PATENT DOCUMENTS

| | | | | |
|---|---|---|---|---|
| JP | 08-9573 | * | 1/1996 | H02K 1/27 |
| JP | 09-19091 | * | 1/1997 | H02K 1/27 |
| WO | 97-45917 | * | 12/1997 | H02K 1/27 |

OTHER PUBLICATIONS

U.S. Appl. No. 12/786,720, filed May 25, 2010.

* cited by examiner

*Primary Examiner* — Burton Mullins
(74) *Attorney, Agent, or Firm* — Armstrong Teasdale LLP

(57) ABSTRACT

A method for securing a plurality of permanent magnets about a perimeter of a rotor core is described that includes positioning the plurality of magnets with respect to the rotor core, the magnets including at least one feature formed at each side thereof, each feature opposing a feature formed in an adjacent magnet, and applying a material between the magnets that engages the features formed in the magnets to form a molded material, the material extending into a groove formed within the rotor core such that the molded material operates to engage the rotor core, the engagement of the molded material with the rotor core and the engagement of the molded material with the magnets operative to maintain a position of the magnets with respect to the rotor core.

18 Claims, 6 Drawing Sheets

PERMANENT MAGNET ROTORS AND METHODS OF ASSEMBLING THE SAME

BACKGROUND OF THE INVENTION

The field of the disclosure relates generally to electric machines, and more specifically, to a permanent magnet rotor for use in an electric machine and to methods of assembling such rotors.

Various types of electric machines include permanent magnets. For example, a direct current (DC) motor may include a plurality of permanent magnets coupled to an exterior surface of a rotor core. Typically, the plurality of permanent magnets are coupled to the exterior surface of the rotor core using an adhesive and/or a retaining ring. The plurality of permanent magnets must be coupled to the rotor core such that the permanent magnets remain coupled to the rotor core even when high speed rotation of the rotor exerts forces on the permanent magnets tending to separate the permanent magnets from the rotor core.

Magnets attached to the rotor core with an adhesive are known to have bonding issues. Specifically, magnets have been known to detach from the rotor core during periods of high RPM motor operation. Reliability of magnet retention hinges on strict process control in manufacturing, for example, chemical preparation and application with respect to the rotor core, the magnets, and the adhesive.

In end use applications, environmental factors such as temperatures and humidity as well as other corrosive elements affect integrity of a rotor having magnets attached thereto with an adhesive. It is not uncommon to see bonding failures either at a test facility or in the end use application due to aforementioned factors.

BRIEF DESCRIPTION OF THE INVENTION

In one aspect, a method for securing a plurality of permanent magnets about a perimeter of a rotor core is provided. The method includes positioning the plurality of magnets with respect to the rotor core, the magnets including at least one feature formed at each side thereof, each feature opposing a feature formed in an adjacent magnet, and applying a material between the magnets that engages the features formed in the magnets to form a molded material, the material extending into a groove formed within the rotor core such that the molded material operates to engage the rotor core, the engagement of the molded material with the rotor core and the engagement of the molded material with the magnets operative to maintain a position of the magnets with respect to the rotor core.

In another aspect, a permanent magnet rotor is provided that includes a rotor core having a plurality of grooves extending into the rotor core, a plurality of permanent magnets spaced about an outer perimeter of the rotor core, each magnet having at least one feature formed at each side thereof, each feature opposing a feature formed in an adjacent magnet, and a molded material between adjacent magnets. The molded material extends into each groove formed within the rotor core such that the molded material operates to engage the rotor core. The molded material between the magnets extends onto the at least one feature at each side of the magnets such that the molded material operates to engage the magnets, the engagement of the molded material with the rotor core and the engagement of the molded material with the magnets operative to maintain a position of the magnets with respect to the rotor core.

In still another aspect, an electric machine is provided that includes a stator assembly defining a bore and a rotor assembly operatively placed within the bore and having a rotor core, a plurality of magnets spaced about the rotor core, and a molded material that extends from grooves formed in the rotor core to operatively engage a portion of the magnets such that the magnets are retained in a position with respect to the rotor core.

The features, functions, and advantages that have been discussed can be achieved independently in various embodiments or may be combined in yet other embodiments further details of which can be seen with reference to the following description and drawings.

DETAILED DESCRIPTION OF THE INVENTION

The methods, systems, and apparatus described herein facilitate efficient and economical manufacturing of an electric machine. Although described herein as associated with an electric motor, the methods, systems, and apparatus described herein may also be associated with an electric generator. A permanent magnet retention feature is described herein which is utilized instead of an adhesive to retain magnets in place with respect to the rotor core.

In at least one embodiment, the permanent magnet retention feature includes a molded material that is placed within slots and/or grooves formed in the rotor core. The molded material extends outwards from the rotor core such that it overlaps portions of specifically shaped magnets placed about a perimeter of the rotor core. As further described herein, the rotor magnets are shaped such that a portion of the molded material operates to secure the magnets in position with respect to the rotor, thereby countering the centrifugal forces encountered during motor operation. Particularly, and in specific embodiments, the molded material and the magnets are shaped such that the molded material does not ingress onto the face of the magnets. One result accruing from such embodiments is that an air gap between the magnets and stator teeth of a motor is unchanged from known permanent magnet motors. Additionally, stator configuration is not impacted. In specific embodiments and as described below, additional grooves are created in the rotor core laminations for ease in magnet placement and to enhance retention quality.

Figure 1:
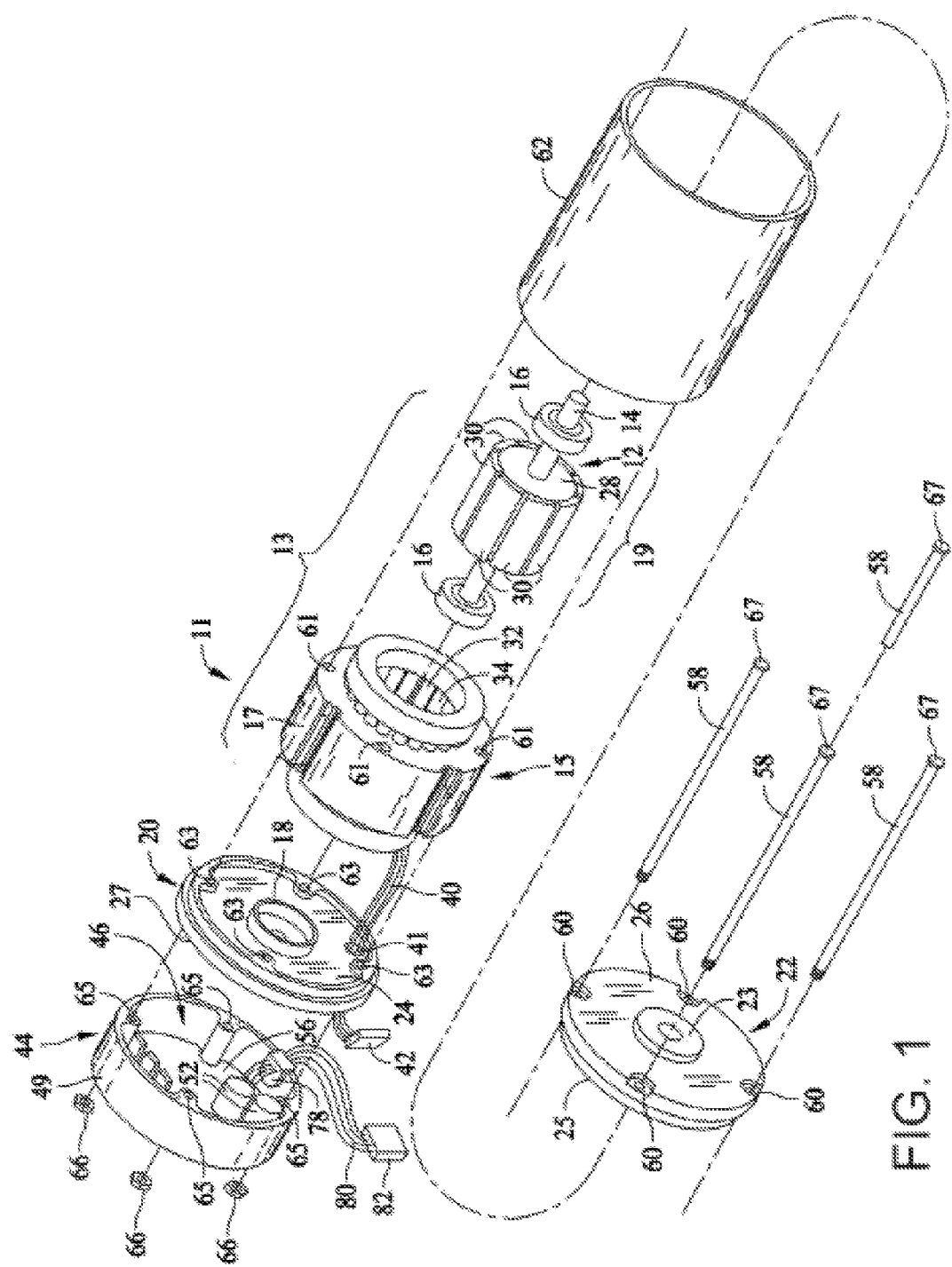
FIG. 1 is an exploded view of an exemplary embodiment of an electric motor.

Referring to the drawings, and more particularly to FIG. 1, reference character 11 generally designates one known integrated electronically commutated motor and control circuit assembly. Motor assembly 11 includes a brushless electronically commutated DC motor 13 having a stationary assembly 15 including a stator or core 17 and a rotatable assembly 19 including a permanent magnet rotor 12 and a shaft 14. A fan (not shown) or other means to be driven such as means for moving air through an air handling system engages the shaft 14.

Rotor 12 is mounted on and keyed to the shaft 14 journaled for rotation in conventional bearings 16. The bearings 16 are mounted in bearing supports 18 integral with a first end member 20 and a second end member 22. The end members 20 and 22 are substantially flat and parallel to each other and may be referred to as end shields. The end members 20 and 22 have inner facing sides 24, 25 between which the stationary assembly 15 and the rotatable assembly 19 are located. Each end member 20 and 22 has an outer side 26, 27 opposite its inner side 24, 25. Additionally, second end member 22 has an aperture 23 for the shaft 14 to pass through and extend out from the outer side 26.

The rotor 12 comprises a ferromagnetic core 28 and is rotatable within the bore of stator 17. In the illustrated embodiment, eight essentially identical magnetic material elements or relatively thin arcuate segments 30 of permanent magnet material, each providing a relatively constant flux field, are secured, for example, by adhesive bonding to rotor core 28. The segments 30 are magnetized to be polarized radially in relation to the rotor core 28 with adjacent segments 30 being alternately polarized as indicated. Motor having interior permanent magnets, for example, mounted within the core 28 are also known.

Stationary assembly 15 comprises a plurality of winding stages 32 adapted to be electrically energized to generate an electromagnetic field. Stages 32 are coils of wire wound around teeth 34 of the laminated stator core 17. The winding end turns extend beyond the stator end faces and winding terminal leads 40 are brought out through an aperture 41 in the first end member 20 terminating in a connector 42. While stationary assembly 15 is illustrated for purposes of disclosure, other stationary assemblies of various other constructions having different shapes and with different number of teeth are known.

Motor assembly 11 further includes a cap 44 which is mounted on the rear portion of the motor assembly 11 to enclose within the cap 44 a control circuit 46 for the motor 13. The cap 44 and the control circuit 46 may sometimes be referred to collectively as a motor control assembly. Cap 44 includes a substantially annular side wall 49. When assembly is completed, the control means 46 are positioned adjacent the outer side 27 of the first end member 20. The control circuit 46 includes a plurality of electronic components 52 and a connector (not shown) mounted on a component board 56, such as a printed circuit board. The control circuit 46 is connected to the winding stages 32 by interconnecting connector 42 and connector (not shown). The control circuit 46 applies a voltage to one or more of the winding stages 32 at a time for commutating the winding stages 32 in a preselected sequence to rotate the rotatable assembly 19 about an axis of rotation.

As mentioned herein, the engagement between the first end member and the cap 44, which is sometimes referred to as a housing, substantially forms a chamber for electronic components 52 and component board 56 which does not allow for any air flow across the components 52.

To effect this engagement, connecting elements 58 comprising a plurality of bolts pass through bolt holes 60 in the second end member 22, bolt holes 61 in core 17, bolt holes 63 in first end member 20, and bolt holes 65 in cap 44. The head 67 of the connecting elements 58 engage the second end member 22. The connecting elements 58 are adapted to urge the second end member 22 and the cap 44 toward each other thereby supporting the first end member 20, the stationary assembly 15, and the rotatable assembly 19 therebetween. Additionally, a housing, or chassis, 62 may be positioned between the first end member 20 and the second end member 22 for enclosing and protecting the stationary assembly 15 and the rotatable assembly 10.

In some known rotors 12, the magnets 30 are attached to the rotor core 28 using an adhesive. Rotor core 28 and stator core 17 are illustrated as being solid in FIG. 1 for simplicity, their construction from a laminated stack being well known to those of ordinary skill in the art. While FIG. 1 is an illustration of an electronically commutated motor, the methods and apparatus described herein may be included within any permanent magnet motor, including motors having any number of phases, including single phase and multiple phase electric motors.

In the exemplary embodiment, motor assembly 11 is coupled to a work component (not shown in FIG. 1) included within a commercial and/or industrial application. The work component may include, but is not limited to, a pump system, an air handling unit, and/or manufacturing machinery (e.g., conveyors and/or presses). In such applications, motor assembly 11 may be rated at, for example only, three horsepower (hp) to sixty hp. In an alternative embodiment, the work component may include a fan for moving air through an air handling system, for blowing air over cooling coils, and/or for driving a compressor within an air conditioning/refrigeration system. More specifically, motor assembly 11 may be used in air moving applications used in the heating, ventilation, and air conditioning (HVAC) industry, for example, in residential applications using ⅓ horsepower (hp) to 1 hp motors. Although described herein using the above examples, motor assembly 11 may engage any suitable work component and be configured to drive such a work component.

Figure 2:
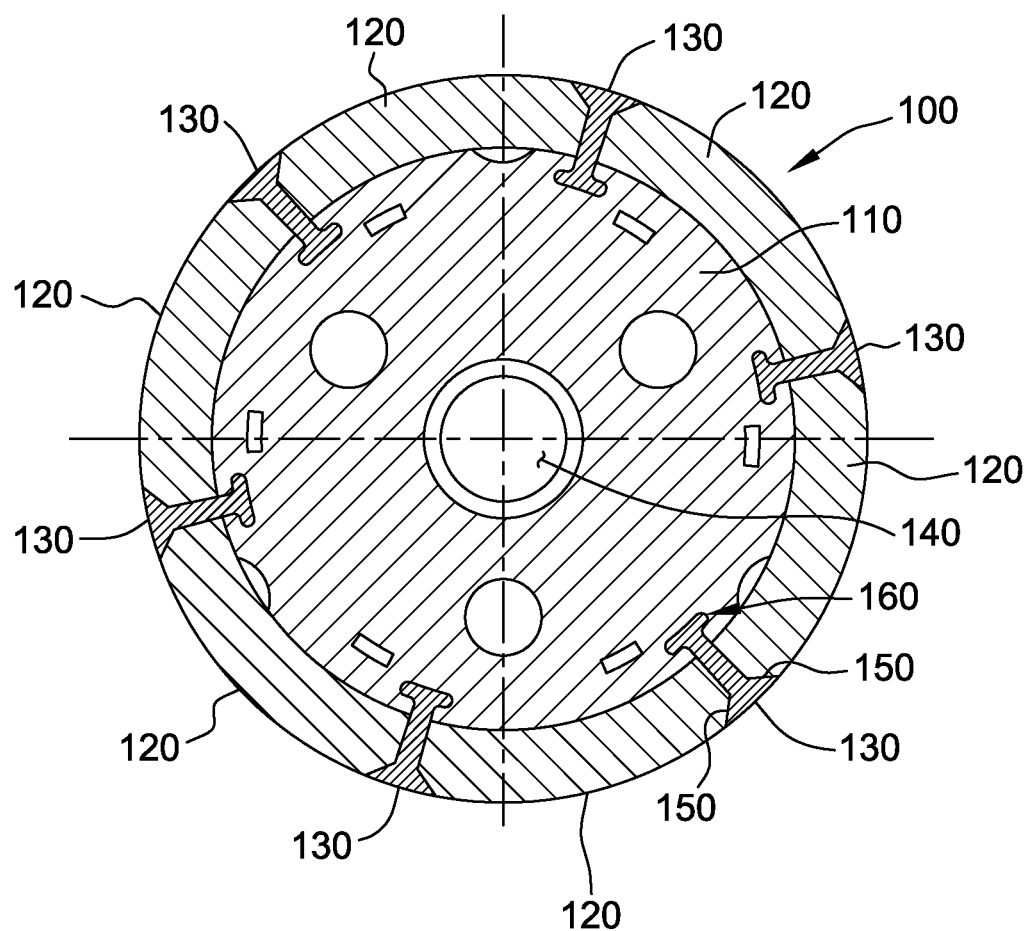
FIG. 2 is a front cutaway view of a rotatable assembly according to one embodiment.

FIG. 2 is a front cutaway view of a rotatable assembly 100 according to one embodiment, which may be utilized in a permanent magnet motor. In the illustrated embodiment, rotatable assembly 100 includes a rotor core 110, magnets 120 and molded material 130, which, as can be seen from the depiction, operates to maintain a position of the magnets 120 with respect to the rotor core 110. Rotor core 110 includes a shaft opening 140 having a diameter corresponding to a diameter of a shaft to be utilized within the motor. As explained in the following paragraphs, the molded material 130 is utilized instead of an adhesive to retain magnets 120 in position with respect to the rotor core 110. As shown in FIG. 2 and more fully explained with respect to FIGS. 3-5, magnets 120 are shaped such that a portion of the molded material 130 engages a beveled wall 150 at each side of the magnets 120 to hold the magnets 120 in position with respect to the rotor core 110. The molded material 130 counters the centrifugal force experienced by the magnets 120 during motor operation. Further, grooves 160 are formed in the rotor core 110 which also accept a portion of the molded material 130. In the illustrated embodiment, the grooves 160 in the rotor core 110 are T-shaped, which maintains the molded material 130 within the rotor core 110 during core rotation. Other shapes other than the T-shape may be utilized as long as the shape formed in the core is one that will operate to maintain the molded material therein during rotor rotation. As shown, the molded material 130 extends from the grooves 160 to the outer perimeter formed by the magnets 120, and fills in the area extending from the grooves 160 and between the beveled walls 150 of adjacent magnets 120 and operates to retain the magnets 120 in position with respect to rotor core 110.

Figure 3:
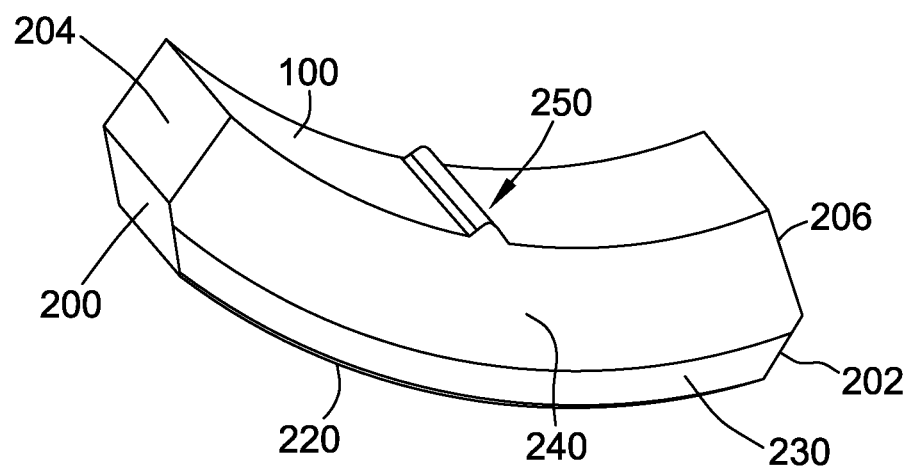
FIG. 3 is an illustration of a single magnet of the rotatable assembly of FIG. 2.

FIG. 3 is an illustration of a single magnet 120 of rotatable assembly 100. As mentioned above, each magnet 120 is shaped with features that in combination with the molded material counter the centrifugal force encountered during motor operation. Two surfaces 200, 202 of the magnet 120 have important roles in magnet retention. The two surfaces include the two beveled walls 150 mentioned above and are referred to hereinafter as beveled walls 200, 202. Respective magnet walls 204, 206 extend from beveled walls 200, 202 and are joined by an inner perimeter surface 210 therebetween. The inner perimeter surface 210 is placed adjacent the rotor core 110 during rotor construction. The beveled walls 200, 202 are joined by an outer perimeter surface 220 therebetween which during motor operation is adjacent the air gap. A second beveled surface 230 is substantially parallel to outer perimeter surface 220 and corresponds to one end of the rotatable assembly 100 (see FIG. 6). A magnet end wall 240 (a second magnet sidewall is not shown in FIG. 2) extends between magnet walls 204, 206 and is substantially perpendicular to the inner perimeter surface 210.

Magnet walls 204, 206 are in line with the centrifugal direction experienced during motor operation. Therefore, molded material 130 deposited adjacent these two surfaces do not provide any meaningful resistance to the centrifugal force except for some friction. However, beveled walls 200, 202 are angled relative to the surfaces of magnet walls 204, 206. As such molded material 130 deposited onto the surfaces of beveled walls 200, 202 will operate to hold the magnet 120 in place during periods of centrifugal force. In embodiments, the second beveled surfaces 230 and molded material 130 also operate to hold the magnet 120 in place during periods of centrifugal force.

As shown in FIG. 2, magnets 120 are spaced out around the perimeter of the rotor core 110. The gaps between the magnets 120 are filled with molded material 130. In embodiments, the distance between magnets 120 determines the strength of the molded structure. In certain embodiments, and to help center the magnet 120 on the rotor core 110 during the molded process, a bump-out 250 may be formed in the inner perimeter surface 210, which is essentially under the magnet 120. A corresponding indentation is formed or stamped out of the rotor core 110 as explained with respect to FIG. 4. The bump-out 250 and indentation operate to properly position the magnet with respect to the rotor core 110. The bump-out/indentation feature may not be utilized in fabrication processes where other methods are used to center the magnets 120 on the rotor core 110. In alternative embodiments, however, the bump-out 250 and indentation may of any shape. In one example, the magnets may be configured with the indentation and the rotor core with the bump-outs. Generally, embodiments may be referred to as a core engaging feature and a magnet engaging feature, and that the magnets are placed about the rotor core such that the core engaging feature engages a corresponding magnet engaging feature.

Figure 4:
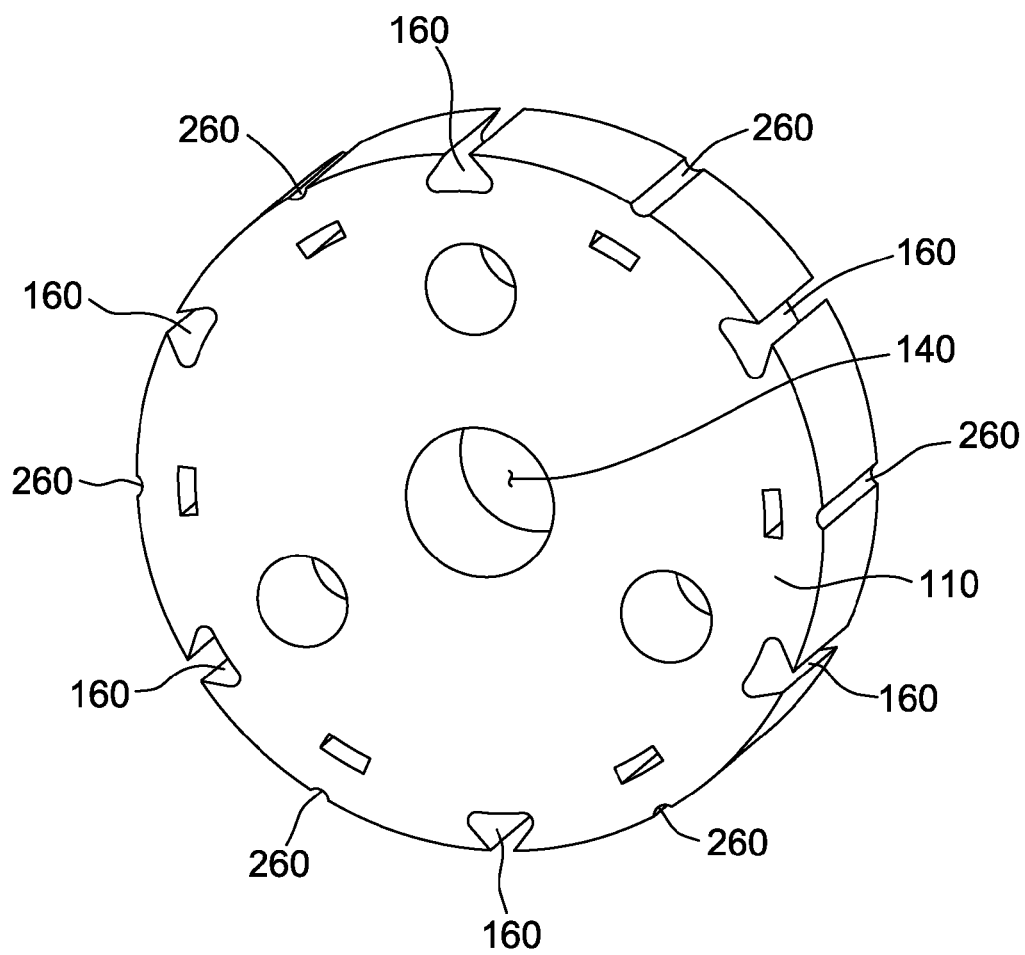
FIG. 4 is an illustration of a rotor core which has a plurality of grooves formed therein for placement of molded material therein.

Referring now to FIG. 4, the rotor core 110 has the aforementioned grooves 160 which are configured to reinforce the molded structure of molded material 130 (shown in FIG. 2) to counter centrifugal force. The grooves 160 operate to give the molded material formed between the magnets 120 (shown in FIGS. 2 and 3) a foothold in the rotor core 100, greatly enhancing magnet retention quality. The molded material 130 operates as an anchored beam between respective magnets 120, but also dispenses with the need to create dividers in the rotor core laminations. The magnets 120 cannot shift relative to the rotor core 110 due to the geometry of molded material 130 as further described herein.

As mentioned above, indentions 260 may be incorporated in the rotor core 110 for aligning the magnets 120 on the rotor core 110 to ensure even magnet spacing. Another benefit accruing from the use of indentations 260 is that due to a specific layout for the rotor core 110 and the magnets 120, access to grooves 160 for application of molded material 130 are not blocked by the magnets 120. More specifically, a proper engagement between the various bump-outs and indentations ensures that the grooves 160 can be accessed for the application of the molded material 130 which is applied in a liquid form, and sets up as a solid.

Figure 5:
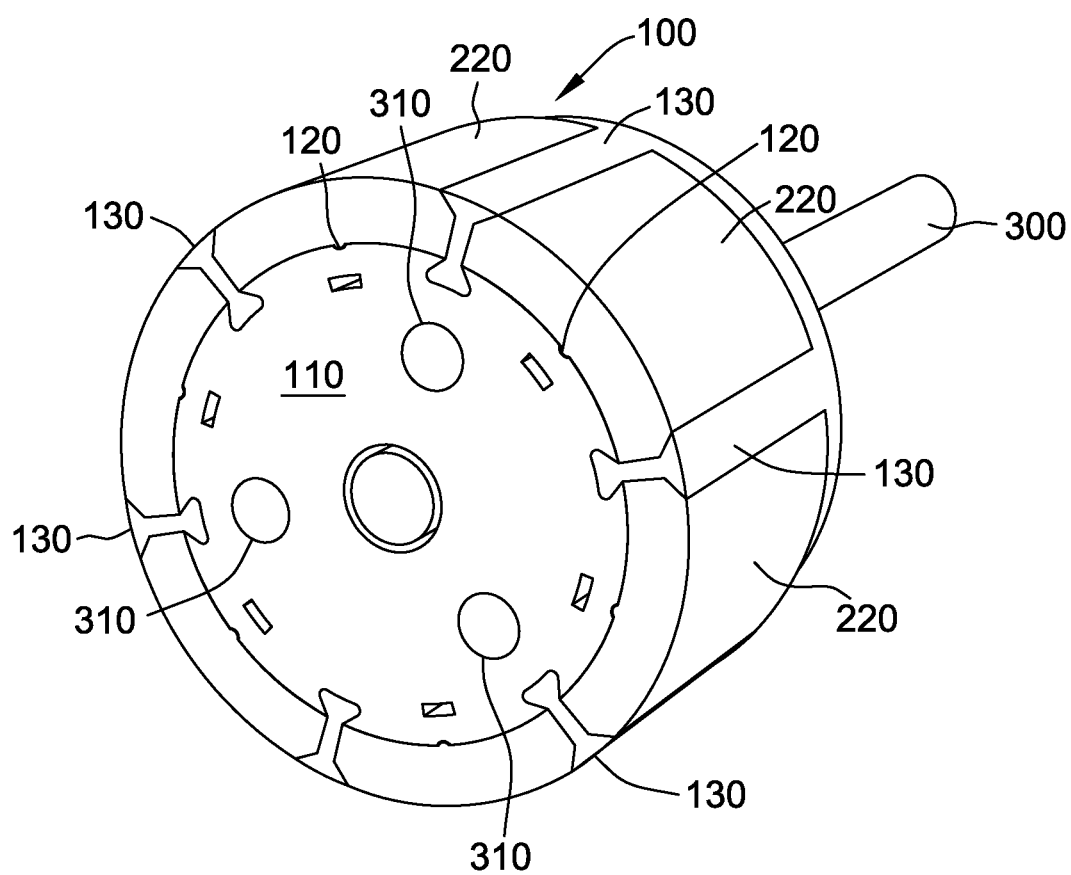
FIG. 5 is a perspective front cutaway view of the rotatable assembly of FIG. 2 and further illustrating the orientation of a portion of the molded material with respect to the magnets and the rotor core of the rotatable assembly.
Figure 6:
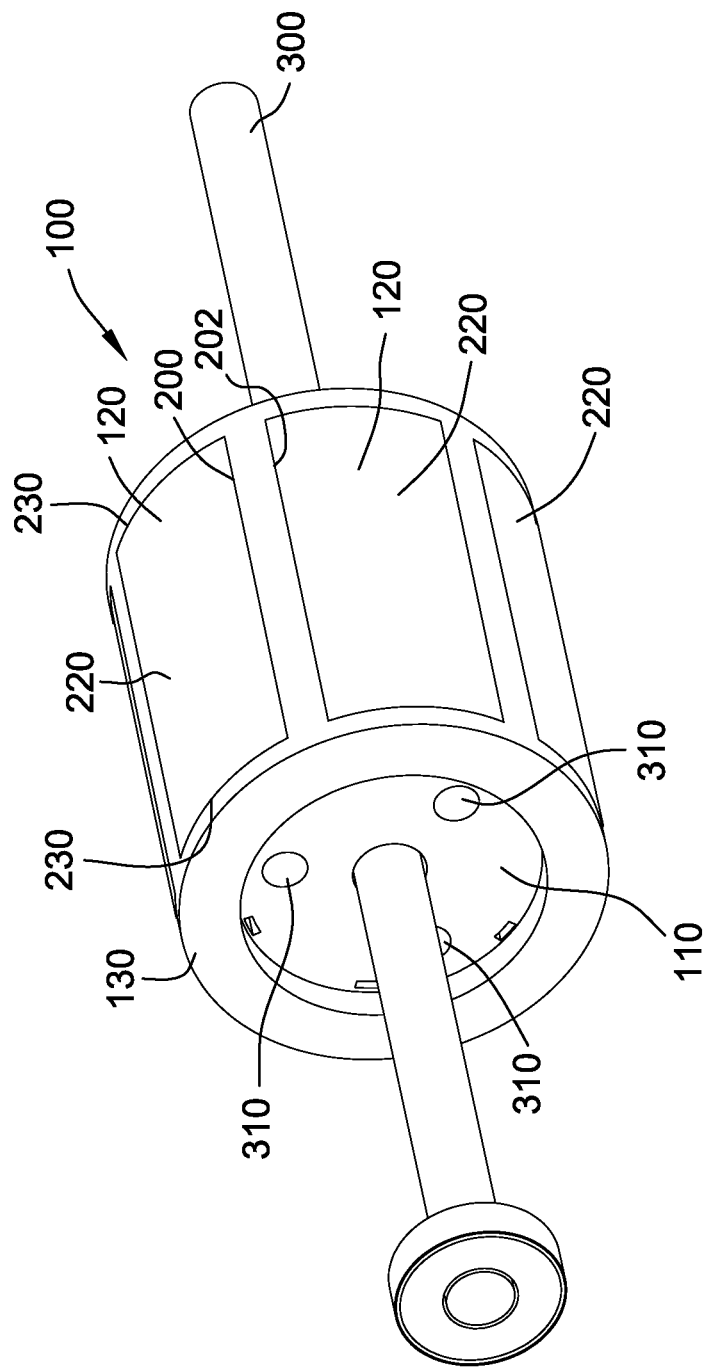
FIG. 6 is a perspective view of the entire rotatable assembly illustrating that the molded material may also be formed along second beveled surfaces of each of the magnets of the rotatable assembly.

FIG. 5 is a perspective front cutaway view of rotatable assembly 100 further illustrating the orientation of a portion of the molded material 130 with respect to the magnets 120 and the rotor core 110. FIG. 5 further illustrates that grooves 160 and the molded material may extend the entire length of the rotor core 110. FIG. 6 is a perspective view of the entire rotatable assembly 100 including shaft 300 and further illustrating that the molded material 130 is formed not only along the beveled walls 200, 202 of the magnets 120, but also along the second beveled surfaces 230 of each of the magnets 120.

For the application of the molded material 130 to the rotor core 110 and magnets 120, the shaft hole 140 and airflow holes 310 are used for positioning and orientation of the rotor core and magnet assembly in a mold. For the magnets 120, as described above, alignment with the rotor core 110 is accomplished either by means of the bump-out 250 on the magnet 120 as described above or through the mold tooling itself. In embodiments, the molds are configured such that no molded material 130 ingresses onto the faces (outer perimeter surfaces 220) of the magnets 120 during the over-molding process. The reinforcement grooves 160 as well as the beveled walls 200, 202, second beveled surfaces 230, and the magnet walls 204, 206 are filled or covered with the molded material 130 to form the desired retention structure that counteracts the centrifugal force experienced by the magnets 120.

The molded material 130 must be rugged enough to withstand targeted stress that is applied by the magnets 120 during motor operation (rotor assembly rotation. In one embodiment, molded material 130 is a 30% glass reinforced polybutylene terephthalate.

Over-molding as described herein can overcome the disadvantages attributable to failed adhesive in permanent magnet motors. Further, and as described herein, over-molding to form molded material 130 is not subject to delicate process control that are found in typical chemical preparation and application situations. The molded material 130 is robust to environmental impacts such as temperature, humidity and exposure to corrosive elements and as such, over-molded rotors such as rotatable assembly 100 offer superior reliability than do rotors that incorporate magnets adhesively coupled to rotor cores.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A permanent magnet rotor comprising:
   a rotor core comprising a plurality of grooves extending into the rotor core;
   a plurality of permanent magnets spaced about an outer perimeter of said rotor core, each said magnet comprising at least one side feature formed at each side thereof and at least one end feature formed at each end thereof, each said side feature opposing a said side feature formed in an adjacent said magnet, wherein said at least one side feature includes a first beveled wall that extends substantially an entire axial length of said magnet, and wherein said at least one end feature includes a second beveled wall extending between a magnet end wall and a magnet radially outer wall and substantially an entire circumferential length of said magnet; and
   a molded material, said molded material extending into each said groove formed within said rotor core such that the molded material operates to engage the rotor core, said molded material extending onto said first beveled walls and said second beveled walls such that the molded material operates to engage said magnets, the engagement of said molded material with said rotor core and the engagement of said molded material with said magnets operative to maintain a position of said magnets with respect to said rotor core.

2. The permanent magnet rotor according to claim 1 wherein:
   said rotor core comprises a magnet engaging feature formed on a radially outer surface thereof; and
   said magnets each comprise a core engaging feature formed on a radially inner surface thereof, said magnets placed about said rotor core such that said core engaging feature engages a corresponding said magnet engaging feature such that said magnets are positioned with respect to said rotor core as said molded material is formed.

3. The permanent magnet rotor according to claim 1 wherein said grooves comprise a T-shaped groove positioned substantially between corresponding said magnets.

4. The permanent magnet rotor according to claim 1 wherein said molded material overlaps said first beveled walls and said second beveled walls formed in said magnets.

5. The permanent magnet rotor according to claim 1 wherein said first beveled walls are substantially orthogonal to said second beveled walls, said molded material further engaging said first beveled walls and said second beveled walls to at least partially define an end of said rotor.

6. The permanent magnet rotor according to claim 1 wherein said molded material comprises a 30% glass reinforced polybutylene terephthalate.

7. The permanent magnet rotor according to claim 1 wherein:
   said plurality of grooves extending into said rotor core extend across a length of said rotor core.

8. An electric machine comprising:
   a stator assembly defining a bore; and
   a rotor assembly operatively placed within the bore and comprising a rotor core, a plurality of magnets spaced about said rotor core, and a molded material that extends from grooves formed in said rotor core to operatively engage a portion of said magnets such that said magnets are retained in a position with respect to said rotor core, wherein said magnets each comprise at least one first beveled wall extending between a magnet sidewall and a magnet radially outer wall and at least one second beveled wall extending between a magnet end wall and the magnet radially outer wall, said first beveled walls and said second beveled walls configured for engagement with said molded material.

9. The electric machine according to claim 8 wherein said magnets each comprise a face for placement proximate an air gap, said faces not engaged with said molded material.

10. The electric machine according to claim 8 wherein said grooves each comprise a T-shaped groove positioned substantially between corresponding said magnets.

11. The electric machine according to claim 8 wherein said grooves extend across a length of said rotor core.

12. The electric machine according to claim 8 wherein said first beveled walls extend substantially an entire axial length of said magnet and said second beveled walls extend substantially an entire circumferential length of said magnet.

13. A method for securing a plurality of permanent magnets about a perimeter of a rotor core, said method comprising:
   positioning the plurality of magnets with respect to the rotor core, the magnets including at least one side feature formed at each side thereof and at least one end feature formed at each end thereof, each side feature opposing a side feature formed in an adjacent magnet, wherein the at least one side feature includes a first beveled wall that extends substantially an entire axial length of the magnet, and wherein the at least one end feature includes a second beveled wall extending between a magnet end wall and a magnet radially outer wall and substantially an entire circumferential length of the magnet; and
   applying a material between the magnets that engages the first beveled walls and the second beveled walls to form a molded material, the material extending into a groove formed within the rotor core such that the molded material operates to engage the rotor core, the engagement of the molded material with the rotor core and the engagement of the molded material with the magnets operative to maintain a position of the magnets with respect to the rotor core.

14. The method according to claim 13 further comprising:
   forming a plurality of indentations in a radially outer surface of the rotor core to correspond with magnet locations;
   forming bumps on a radially inner surface of the magnets to correspond to the indentations; and
   using the indentations and bumps to position the magnets with respect to the rotor core as the material is applied to form the molded material.

15. The method according to claim 13 wherein applying a material, the material extending into a groove comprises applying the material to extend into a plurality of T-shaped grooves formed within the rotor core, each T-shaped groove positioned substantially between corresponding magnets.

16. The method according to claim 13 wherein applying a material between the magnets that engages the first beveled walls and the second beveled walls comprises applying a material between the magnets that overlaps the first beveled walls and the second beveled walls formed in the magnets.

17. The method according to claim 13 wherein applying a material between the magnets that engages the first beveled walls and the second beveled walls comprises ensuring that the material does not ingress onto faces of the magnets.

18. The method according to claim 13 wherein applying a material further comprises applying a 30% glass reinforced polybutylene terephthalate.

* * * * *